Aug. 21, 1956  J. A. DONELAN  2,760,042
APPARATUS AND METHODS FOR WELDING METAL TUBES
Filed Dec. 2, 1953  2 Sheets-Sheet 1

INVENTOR
James Arthur Donelan
BY
ATTORNEY

Aug. 21, 1956  J. A. DONELAN  2,760,042
APPARATUS AND METHODS FOR WELDING METAL TUBES
Filed Dec. 2, 1953  2 Sheets-Sheet 2

INVENTOR
James Arthur Donelan
BY
Elfons Finelstein
ATTORNEY

United States Patent Office 2,760,042
Patented Aug. 21, 1956

2,760,042

APPARATUS AND METHODS FOR WELDING METAL TUBES

James Arthur Donelan, West Harrow, England, assignor to The General Electric Company Limited, London, England Application December 2, 1953, Serial No. 395,689

Claims priority, application Great Britain December 3, 1952

12 Claims. (Cl. 219—6)

The present invention relates to apparatus and methods for electric arc welding a seam in a metallic tube.

It has been proposed that a tube should be manufactured from strip material by bending the strip progressively to form an open tube the edges of the strip material subsequently being welded together to form a closed tube. The welded seam may extend longitudinally along the length of the tube, or if desired it may extend helically along and around the tube.

According to one aspect of the present invention apparatus for electric arc welding a seam extending along a metal tube or the like comprises means for moving the tube to be welded past a normally stationary welding torch to cause the seam to be welded to pass in welding association with the torch, said welding torch being movable in the direction of movement of the tube for starting and re-starting of welding.

According to another aspect of the present invention in a method of electric arc welding a seam extending along a tube or the like in which the tube is arranged to move past a normally stationary welding torch, the welding torch is arranged to be movable in the direction of movement of the tube for starting or re-starting of welding.

When welding of a seam is to be re-started it is desirable that a short length of the seam should be welded again in order to avoid the formation of an unwelded zone. In order to effect this, the welding torch may be displaced in the direction of movement of the tube so as to bring the torch over a welded portion of the seam close to the end of the region in which welding has been effected. The tube to be welded is then caused to move past the welding torch during welding so that a short length of the seam is welded again. Thereafter the welding torch is gradually moved in a direction opposite to that of the movement of the tube until it reaches its normal position. The movement of the welding torch in the direction opposite to the direction of movement of the tube can be effected manually if desired but preferably such movement is arranged to be effected automatically at a slow speed compared with the speed of movement of the tube. For example, the speed of movement of the welding torch may be arranged to be of the order of a few percent or up to, say, 10% of the speed of movement of the tube. This slow speed of movement of the welding torch is necessary in order that the heat input to the seam during welding while the welding torch is moving may not be greatly less than the heat input under normal conditions of welding when the welding torch is stationary. A feature of this invention, however, consists in providing means for increasing the welding current during the period that the welding torch is moving in order to compensate for the greater speed of movement of the torch relatively to the tube.

One arrangement in accordance with the present invention as applied to the welding of a straight longitudinal seam in a tube will now be described by way of example with reference to the accompanying drawings in which.

Figure 1:
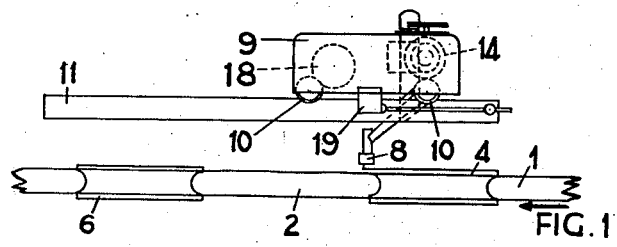
Figures 1 and 2 are side elevational and plan views respectively showing the welding torch in the normal position.
Figure 2:
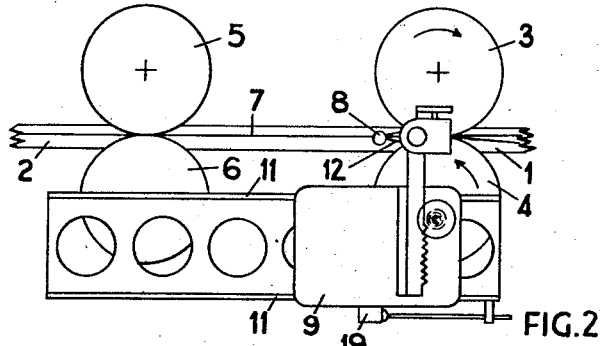

Referring to the drawings an open tube 1 which has been formed by bending a strip of metal such for example as aluminum, has a longitudinal seam weld 7 effected by a welding torch 8 which may for example be of the argon arc type. The welding torch 8 may be of a type having a single electrode arranged to be fed with single-phase alternating current or if desired it may be of a type having two electrodes arranged to be fed with two-phase or three-phase alternating current, the common return line or third phase as the case may be being connected to the tube to be welded. In the arrangement described herein two-phase welding current is used. During normal welding, that is to say, during welding after an initial starting or re-starting period, the welding torch is maintained stationary in the position shown in Figures 1 and 2, in relation to two pairs of shaped rolls, one pair of rolls 5 and 6 acts on the tube after welding while the other pair 3 and 4 acts on the open tube a short distance before the normal position of the welding torch as shown in Figure 2. The welding torch 8 is mounted on an arm 12 adjustably supported by a carriage 9 having wheels 10 movable along rails 11 which extend parallel to the direction of movement of the tube so that the welding torch 8 can be moved in the direction of movement of the tube. It will be appreciated that provision may be made for adjusting the position of the welding torch 8 in two directions transversely of the direction of movement of the tube so that the welding arc is positioned correctly in relation to the seam to be welded.

Figure 3:
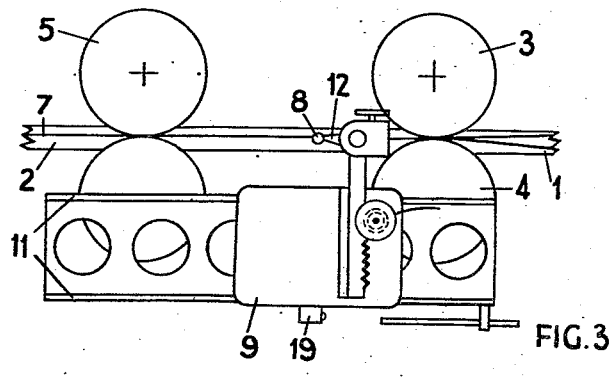
Figure 3 is a plan view showing the welding torch in the position for restarting welding of a tube.

During re-starting of welding the welding torch is moved on its carriage to a position as shown in Figure 3 to bring the torch 8 into a position in which it lies in welding association with a part of the seam 7 which has already been welded so that on re-starting a short length of the seam is re-welded. For example, if the tube is arranged to move past the welding torch at a speed of the order of, say, three to six feet per minute, the welding torch may be positioned a few inches from the end of the already welded seam. Preparatory to the re-striking of the welding arc the drive (not shown) for causing the tube to travel past the welding torch 8 is brought up to speed so that at the instant when the welding arc is initiated the tube is travelling at about its normal speed. After the welding arc has been re-established the carriage 9 is moved along the rails 11 by means of an electric motor 18 hereinafter referred to as a tractor motor in the direction opposite to the direction of movement of the tube to return the welding torch 8 to its normal position. As above mentioned, the speed of movement of the welding torch should be of the order of a few percent of the speed of movement of the tube. When the welding torch has reached its normal position as shown in Figures 1 and 2 the carriage 9 is stopped and it is maintained in this position until it is necessary again to start or re-start the welding operation.

Figure 4:
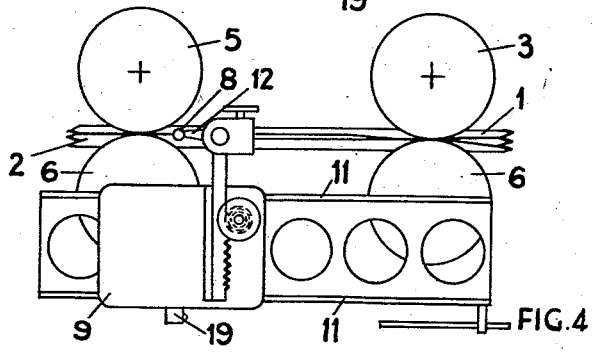
Figure 4 is a similar view showing the welding torch in the position for starting welding of a tube.
Figure 5:
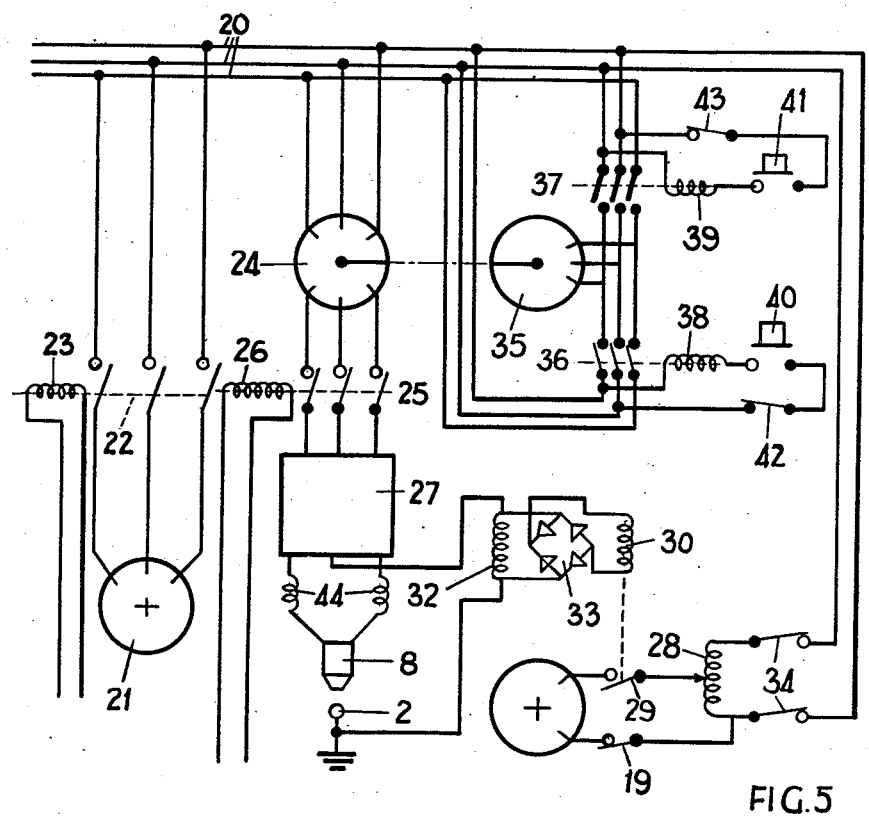
Figure 5 is a somewhat simplified diagram of the electrical connections of the apparatus.

For starting welding of an unwelded open tube a slightly different technique is desirable owing to the fact that except in the positions in which the edges of the open tube are pressed together and supported by the guiding rolls 3 and 4 or 5 and 6 there is a tendency for the edges to separate. For this reason when starting the welding of an open tubular sheath the welding torch 8 is moved on its carriage so that it occupies a position, as shown in Figure 4, in which welding can be started on a portion of the open tube between or closely adjacent to the pair of rolls 5 and 6 which maintain the edges of the tube in contact or at least in close proximity. When welding has been established, the solidification of the just-welded metal exerts a drawing action which maintains the edges of the open tube together so that welding can be effected at a greater distance from a pair of rolls and the welding torch is therefore progressively returned to its normal position intermediate between the two pairs of rolls as shown in Figures 1 and 2. Figure 5 shows a circuit diagram of some of the electrical apparatus used in one arrangement in accordance with the present invention. The tube is arranged to be moved past the welding torch 8 by an electric motor 21 which can be connected to a three-phase supply 20 by a contactor 22 having an operating winding 23. If necessary the edges of the strip material to be welded may be sheared or cleaned, for example by scratch brushing, before the strip material is formed into the open tube. Starting of welding is initiated by energising the operating winding 23 of the contactor 22 to start the electric motor 21 for moving the tube past the welding torch 8. The control circuit for energising this operating winding 23 may include switches responsive for example to the flow of cooling water or shielding gas such as argon if a gas shielded arc is used. At the same time as the motor 21 for moving the tube past the welding torch is started, the means for cleaning the edges of the strip material (if provided) are set in operation. When the motor for moving the tube past the welding torch has reached its normal speed a switching operation is effected to energise the operating winding 26 of a contactor 25 controlling the supply of three-phase current to a three-to-two-phase transformer 27 feeding two-phase current through chokes 44 to the welding torch 8. The tube 2 is connected to the common return line 31 of the welding current supply, the common return line including a current transformer 32 feeding a bridge connected rectifier 33 which feeds the operating winding 30 of a relay. This relay has a normally open contact 29 arranged in the supply circuit for the variable speed tractor motor 18 which is fed through an isolating switch 34 and variable transformer 28 from between two phases of the three-phase supply 20. This circuit also includes a limit switch 19 which is opened when the carriage and torch are in the "normal" position. When the welding arc of arcs is or are established there is a flow of welding current in the welding circuit through the line 31 and the current transformer 32 in this circuit which is arranged to energise the operating winding 30 to complete the circuit for supplying current to the tractor motor 18 which is arranged to cause the carriage to return at a slow speed to its normal position. When the carriage has returned the welding torch to its normal position the limit switch 19 causes the tractor motor and carriage to stop so that the carriage is held in its normal position during welding.

To start the welding of a seam in a tube the procedure is as described above except that the welding torch is initially positioned as shown in Figure 4 in welding association with a part of the seam to be welded where the edges of the strip material are held together by the pair of rolls 5 and 6.

In the arrangement shown in Figure 5 provision is made for adjusting the value of the welding current. An induction regulator 24 is provided in series with the three-to-two-phase transformer 27. The induction regulator 24 is operated by a reversible alternating current electric motor 35 which can be connected to the three-phase supply 20 through a contactor 36 or a contactor 37, these contactors being arranged to give opposite senses of phase rotation. The contactor 36 has an operating winding 38 which can be energised by pressing a push button 40 provided a limit switch 42 connected in series therewith is not open. Similarly the contactor 37 has an operating winding 39 which can be energised by pressing a push button 41 connected in series with a limit switch 43. The limit switches 42 and 43 are arranged to be opened when the induction regulator 24 reaches appropriate limiting positions. In order to increase the welding current one of the push buttons, for example the push button 40, is pressed causing the motor 35 to rotate in one direction, while to decrease the welding current the other push button 41 is pressed to cause the motor 35 to rotate in the opposite direction. Interlocking contacts are provided to prevent simultaneous operation of both the contactors 36 and 37. When a desired value of welding current is reached the push buttons 40 and 41 are released so that both the contactors 36 and 37 are opened so that the motor 35 and induction regulator 24 remain stationary. This arrangement can be used to alter the magnitude of the welding current during welding and can also be used as a preliminary to the starting or re-starting of welding to set the position of the induction regulator 24 so that when welding is started or restarted the welding current will be increased by an amount which is appropriate to the increased speed of movement of the welding torch relatively to the tube as a result of the action of the tractor motor 18 moving the carriage 9.

I claim:

1. In a machine for making metallic tube from strip material by bending the strip progressively to form an open tube with butting edges and electric arc welding the seam formed by said butting edges of said open tube to form a closed tube by advancing the said butting edges past a welding head: welding apparatus comprising a welding torch, a movable carriage for said torch having a normal stationary welding position and at least one position displaced from said normal welding position in the direction of movement of said butting edges of said tube past said welding torch, and means operative upon starting or re-starting of the torch for moving said torch back to its normal stationary welding position at a uniform speed.

2. In a machine for making metallic tube from strip material by bending the strip progressively to form an open tube with butting edges and electric arc welding the seam formed by said butting edges of said open tube to form a closed tube by advancing the said butting edges past a welding head: welding apparatus comprising a welding torch, a movable carriage for said torch having a normal stationary welding position, a first position for restarting welding displaced a short distance from said normal welding position in the direction of movement of said butting edges of said tube past said welding torch, and a second position for starting welding similarly displaced but a longer distance from said normal position, said second position being adjacent a pair of rolls adapted to maintain said butting edges at least in close proximity, and means operative upon starting or re-starting of the torch for moving said torch back to its normal stationary welding position at a uniform speed.

3. In a machine for making metallic tube from strip material by bending the strip progressively to form an open tube with butting edges and electric arc welding the seam formed by said butting edges of said open tube to form a closed tube by advancing the said butting edges past a welding head: welding apparatus comprising a welding torch, a movable carriage for said torch having a normal stationary welding position and a displaced position in the direction of movement of said butting edges past said torch, and means operative upon starting or re-starting of the torch for returning said carriage to its said normal welding position from said displaced position at a uniform speed low compared with that of said tube past said welding torch.

4. Welding apparatus as claimed in claim 3, wherein means are provided for increasing the welding current above its normal value during the low speed return movement of said carriage.

5. Apparatus as claimed in claim 3, wherein said means is an electric motor.

6. In a machine for making metallic tube from strip material by bending the strip progressively to form an open tube with butting edges and electric arc welding the seam formed by said butting edges of said open tube to form a closed tube by advancing the said butting edges past a welding head: welding apparatus comprising a welding torch, a movable carriage for said torch having a normal stationary welding position, a first position for re-starting welding displaced a short distance from said normal welding position in the direction of movement of said butting edges of said tube past said welding torch, and a second position for starting welding similarly displaced but a longer distance from said normal position, said second position being adjacent a pair of rolls adapted to maintain said butting edges at least in close proximity, and means operative upon starting or re-starting of the torch for returning said carriage to its said normal welding position from said displaced positions at a uniform speed low compared with that of said tube past said welding torch.

7. In a machine for making metallic tube from strip material by bending the strip progressively to form an open tube with butting edges and electric arc welding the seam formed by said butting edges of said open tube to form a closed tube by advancing the said butting edges past a welding head: a welding torch, means moving the tube past the torch, a movable carriage for said torch having a normal stationary welding position and at least one position displaced from said normal welding position in the direction of movement of said butting edges of said tube past said welding torch and means operative upon starting or re-starting of the torch for moving said torch back to its normal stationary welding position at a uniform speed.

8. In a machine for making metallic tube from strip material by bending the strip progressively to form an open tube with butting edges and electric arc welding the seam formed by said butting edges of said open tube to form a closed tube by advancing the said butting edges past a welding head: a welding torch, a pair of forming rolls moving the tube toward the torch, another pair of forming rolls maintaining the butting edges of the tube at least in close proximity and pulling the tube past the torch, said pairs of rolls being spaced from one another and located on opposite sides of the torch, a movable carriage for said torch having a normal stationary welding position, a first position for restarting welding displaced a short distance from said normal welding position in the direction of movement of said butting edges of said tube past said welding torch, and a second position for starting welding similarly displaced but a longer distance from said normal position, said second position being adjacent the second pair of rolls, and means operative upon starting or re-starting of the torch for moving said torch back to its normal stationary welding position at a uniform speed.

9. In a process for making metallic tube from strip material by bending the strip progressively to form an open tube with butting edges and electric arc welding the seam formed by said butting edges of said open tube to form a closed tube by advancing the said butting edges past a welding head: a method of welding said seam in which for re-starting of welding of said seam after an interruption of the welding arc, a welding torch is displaced from a normal stationary welding position to a temporary position in the direction of movement of said butting edges of said seam past said torch and is thereafter returned to its said normal position at a uniform speed, low compared with that of said tube past said welding torch.

10. In a process for making metallic tube from strip material by bending the strip progressively to form an open tube with butting edges and electric arc welding the seam formed by said butting edges of said open tube to form a closed tube by advancing the said butting edges past a welding head: a method of welding said seam in which for re-starting of welding of said seam after an interruption of the welding arc, a welding torch is displaced from a normal stationary welding position to a temporary position in the direction of movement of said butting edges of said seam past said torch and is thereafter returned to its said normal position, the welding current being increased above its normal value during return of said welding torch to its said normal position.

11. In a process for making metallic tube from strip material by bending the strip progressively to form an open tube with butting edges and electric arc welding the seam formed by said butting edges of said open tube to form a closed tube by advancing the said butting edges past a welding head: a method of welding said seam in which for starting of welding of said seam, a welding torch is displaced from a normal stationary welding position to a temporary position adjacent a pair of rolls which maintain said butting edges of said seam in said tube at least in close proximity, and is thereafter returned to its said normal position at a uniform speed, low compared with that of said tube past said welding torch.

12. In a process for making metallic tube from strip material by bending the strip progressively to form an open tube with butting edges and electric arc welding the seam formed by said butting edges of said open tube to form a closed tube by advancing the said butting edges past a welding head: a method of welding said seam in which for starting of welding of said seam, a welding torch is displaced from a normal stationary welding position to a temporary position adjacent a pair of rolls which maintain said butting edges of said seam in said tube at least in close proximity, and is thereafter returned to its said normal position, the welding current being increased above its normal value during return of said welding torch to its said normal position.

References Cited in the file of this patent

UNITED STATES PATENTS

| Re. 14,927 | Sessions | July 27, 1920 |
| 1,512,787 | Morton | Oct. 21, 1924 |
| 1,549,450 | Clarkson | Aug. 11, 1925 |
| 1,612,317 | Reed | Dec. 28, 1926 |
| 1,616,145 | Shipman | Feb. 1, 1927 |
| 1,827,245 | Lincoln | Oct. 13, 1931 |
| 1,838,899 | Arnold | Dec. 29, 1931 |
| 2,464,679 | Fletcher et al. | Mar. 15, 1949 |